United States Patent
Frommberger et al.

(10) Patent No.: US 12,510,408 B2
(45) Date of Patent: Dec. 30, 2025

(54) OPTICAL SPECTROMETER

(71) Applicant: Thermo Fisher Scientific (Bremen) GmbH, Bremen (DE)

(72) Inventors: Lutz Frommberger, Bremen (DE); Hans-Jurgen Schluter, Bremen (DE); Konstantin Ayzikov, Bremen (DE); Antonella Guzzonato, Bremen (DE)

(73) Assignee: Thermo Fisher Scientific (Bremen) GmbH, Bremen (DE)

( * ) Notice: Subject to any disclaimer, the term of this patent is extended or adjusted under 35 U.S.C. 154(b) by 205 days.

(21) Appl. No.: 18/258,528

(22) PCT Filed: Dec. 16, 2021

(86) PCT No.: PCT/EP2021/086294
§ 371 (c)(1),
(2) Date: Jun. 20, 2023

(87) PCT Pub. No.: WO2022/136127
PCT Pub. Date: Jun. 30, 2022

(65) Prior Publication Data
US 2024/0044707 A1 Feb. 8, 2024

(30) Foreign Application Priority Data
Dec. 21, 2020 (GB) .................................... 2020271

(51) Int. Cl.
*G01J 3/28* (2006.01)
*G01J 3/18* (2006.01)
*G01J 3/443* (2006.01)

(52) U.S. Cl.
CPC .......... *G01J 3/2803* (2013.01); *G01J 3/1809* (2013.01); *G01J 3/443* (2013.01); *G01J 2003/2813* (2013.01); *G01J 2003/2869* (2013.01)

(58) Field of Classification Search
CPC ....... G01J 2003/2813; G01J 2003/2869; G01J 3/1809; G01J 3/28; G01J 3/2803; G01J 3/443; G01N 21/73
See application file for complete search history.

(56) References Cited

U.S. PATENT DOCUMENTS

| 6,029,115 | A | 2/2000 | Tracy et al. |
| 11,914,129 | B2 * | 2/2024 | Ha ...................... G02B 21/008 |

(Continued)

FOREIGN PATENT DOCUMENTS

| GB | 2431232 A * | 4/2007 | ............... G01J 3/02 |
| WO | WO 2020/198487 | 10/2020 | |

OTHER PUBLICATIONS

International Search Report and Written Opinion for related International Application No. PCT/EP2021/086294, 10 pages, mailed Mar. 17, 2022.

*Primary Examiner* — Hina F Ayub
(74) *Attorney, Agent, or Firm* — Klarquist Sparkman, LLP

(57) ABSTRACT

A method of optical spectroscopy for analysing a sample using an optical spectrometer is provided. The method comprises obtaining a sample spectrum of the sample using the optical spectrometer and obtaining a blank spectrum using the optical spectrometer. The blank spectrum comprises structured background radiation which is correlated with the sample spectrum. A cross-correlation of the sample spectrum and the blank spectrum is determined. A mapped blank spectrum is generated by mapping the blank spectrum to the sample spectrum based on the cross-correlation, and the mapped blank spectrum is subtracted from the sample spectrum to generate a background corrected sample spectrum.

19 Claims, 14 Drawing Sheets

(56) References Cited

U.S. PATENT DOCUMENTS

| | | |
|---|---|---|
| 2002/0185604 A1 | 12/2002 | Coates et al. |
| 2007/0211248 A1 | 9/2007 | Caulfield et al. |
| 2015/0062577 A1* | 3/2015 | Hartwell ................. G01J 3/443 356/307 |
| 2015/0337360 A1 | 11/2015 | Yokoyama et al. |
| 2017/0251191 A1 | 8/2017 | Huang et al. |
| 2019/0339123 A1* | 11/2019 | Farsad ................... G01N 21/73 |

* cited by examiner

OPTICAL SPECTROMETER

CROSS REFERENCE TO RELATED APPLICATIONS

This is the U.S. National Stage of International Application No. PCT/EP2021/086294, filed Dec. 16, 2021, which was published in English under PCT Article 21(2), which in turn claims the benefit of GB Application No. 2020271.9, filed Dec. 21, 2020, which is incorporated herein by reference in its entirety.

FIELD OF THE DISCLOSURE

The present disclosure relates to an optical emission spectrometer and methods of optical emission spectroscopy.

BACKGROUND

Optical spectroscopy is a spectroscopic technique used to determine the properties of light emitted by sources or reflected by objects, and hence to determine the properties of those sources or objects.

An optical spectrometer may use a light source to provide the light to be analysed. For example, a plasma source may be used to provide the light. One challenge in optical emission spectroscopy is to distinguish light associated with the sample from light which may be present in the background (background light) and any noise present. For example, in plasma optical spectroscopy, the plasma source generates light to be used in the analysis. The ability of the optical spectrometer to distinguish light associated with an analyte of interest in the sample from the background light (e.g. from the plasma source) determines the ability of the spectrometer to detect the presence of the analyte of interest in a sample. The limit of detection (LOD) for an optical spectrometer is the ability of the spectrometer to differentiate when a change in intensity is caused by the analyte of interest or by noise.

The LOD of an optical spectrometer may depend on the signal to noise ratio for the analyte of interest. As such both the signal intensity from the sample, and the noise intensity, can affect the LOD for an optical spectrometer. In some methods of optical spectrometry, a relatively low temperature plasma source is used. By having a lower plasma temperature, the extent to which the signal intensity can be increased is limited, thereby limiting the LOD for the optical spectrometer.

A particular example of optical spectrometry is echelle spectrometry, where two diffraction gratings, or a grating and a prism, are used that are rotated 90° relative to each other.

When using such a configuration, a continuous wavelength spectrum can be split up into two substantially perpendicular directions, producing a two-dimensional spectrum which is projected onto a detector. Typically, a semiconductor detector is used, such as a CMOS (complementary metal oxide semiconductor) detector chip. An echelle spectrum typically comprises one or more so-called orders which extend generally along an axis. The wavelength of the light varies along an order. On each order, the echelle spectrum may have one or more peaks in the intensity of light. The peaks are local maxima of the spectrum and are characteristic for a certain atom or molecule. The location of a peak in an echelle spectrum identifies the particular element or molecule causing the peak while the amplitude of the peak indicates the relative quantity of the element of molecule.

The peaks which are incident on the detector can be prone to drift. That is, due to temperature variations the angle or relative distances of the optical components may alter, causing the location of the peaks of the spectrum to change. Variations in the locations of the peaks can change the measured intensity of the peak and the background signal, leading to worse signal to noise ratio. Furthermore, variations in the background signal between measurements make it challenging to eliminate the background signal from the measurements. Techniques to correct for the drift of spectral peaks are known. This drift correction can be performed mechanically (by preventing or correcting movement of optical elements) or using software.

U.S. Pat. No. 6,029,115 discloses a method for correcting drift in optical emission spectroscopy. The method of U.S. Pat. No. 6,029,115 measures the optical spectrum of a "drift standard" at first and second times to calculate two sets of offset data. The offset data are utilized to obtain a spectral shift for measurements performed at a third time (e.g. between the two measurements of the drift standard).

SUMMARY

According to a first aspect of the disclosure, a method of optical spectroscopy for analysing a sample using an optical spectrometer is provided. The method comprises:
  obtaining a sample spectrum of the sample using the optical spectrometer;
  obtaining a blank spectrum using the optical spectrometer, the blank spectrum comprising structured background radiation which is correlated with the sample spectrum;
  determining a cross-correlation of the sample spectrum and the blank spectrum;
  generating a mapped blank spectrum by mapping the blank spectrum to the sample spectrum based on the cross-correlation; and
  subtracting the mapped blank spectrum from the sample spectrum to generate a background corrected sample spectrum.

The method of the first aspect obtains a blank spectrum in addition to a sample spectrum in order to eliminate at least some of the structured background radiation (the background signal) which is present in the sample spectrum. As such the method of the first aspect provides a background corrected sample spectrum in which at least some of the background signal is removed.

The subtraction process aims to remove the structured background radiation (background signal) without causing a statistically significant increase in artificial noise resulting from the subtraction process. For optical spectroscopy, subtracting an as-measured (i.e. unmapped) blank spectrum from a sample spectrum may result in an increase in artificial noise introduced as part of the subtraction process. This is because the blank spectrum and the sample spectrum may not overlap perfectly due to drift in the spectrometer. The method of the first aspect accounts for this possible drift through the process of generating the mapped blank spectrum for subtraction from the sample spectrum.

The method of the first aspect generates a mapped blank spectrum which closely overlaps the sample spectrum in order to reduce any artificial noise introduced as part of the subtraction process. The mapped blank spectrum is generated based on a cross-correlation of the blank spectrum and the sample spectrum. The cross-correlation can be used to identify a transformation for the blank spectrum to generate the mapped blank spectrum.

By subtracting the mapped blank spectrum from the sample spectrum, the structured (i.e. non-random) background signal in the sample spectrum may be reduced or eliminated without increasing any artificial noise. Thus, the signal to noise ratio in the sample spectrum may be improved compared to a process in which the unmapped background spectrum is subtracted from the sample spectrum. The method of the first aspect is particularly applicable to optical emission spectrometers with low temperature plasma sources where signal intensity is lower compared to higher temperature plasma sources. By low-temperature plasma source, this disclosure is referring to plasma sources having a temperature no greater than 7000 K. In particular, the present disclosure is applicable to cold-plasma analyses where the plasma source is operated at a temperature of no greater than: 6000 K, 5000, 4900 K, 4000 K, 3000K, 2000 K, 1500 K or 1400 K. As such, a low temperature plasma source may comprise an Inductively Couple Plasma (ICP) having a plasma gas which is not Ar. For example, a low temperature plasma source includes He ICP plasma sources. A low temperature plasma source may also include glow discharge plasma sources or microwave plasma sources. A low temperature plasma source may also include a microplasma, for example a He ICP microplasma source. For example, in some embodiments, the optical spectrometer comprises a plasma source for obtaining the sample spectrum and the blank spectrum. In some embodiments the plasma source may be an inductively coupled plasma (ICP) source.

By blank spectrum, it is understood that the blank spectrum is obtained in the absence of the sample. The blank spectrum comprises structured background radiation which is correlated with the sample spectrum. That is to say, features of the blank spectrum (i.e. the background signal) can also be found in the sample spectrum. As such, the blank spectrum is obtained under similar experimental conditions as the sample spectrum (but not necessarily exactly the same), for the purpose of eliminating the structured background radiation from the sample spectrum. It is understood that the blank spectrum and the sample spectrum include similar (i.e. overlapping) wavelengths such that each spectrum includes at least a portion of the spectrum that can be correlated with the other spectrum.

Where the optical spectrometer comprises a plasma source for obtaining the sample spectrum and the blank spectrum, the structured background radiation present in the sample spectrum and the blank spectrum is a result of emissions from the plasma gasses of the plasma source. As such, the sample spectrum and the blank spectrum each comprise structured background radiation emitted by the plasma source. The structured background radiation emitted by the plasma source is generally stable in pattern and intensity irrespective of whether a sample is introduced into the optical spectrometer. Due to these characteristics, features of the structured background radiation can be used to "anchor" and precisely overlap the background structures of the blank spectrum (where no analyte peak is present) with corresponding background structures of the sample spectrum (e.g. background structures away from an analyte peak). The structured background radiation of the blank spectrum is correlated with the structured background radiation present in the sample spectrum. As such, the cross-correlation of the sample spectrum and the blank spectrum may be determined based on the structured background radiation present in both spectra.

In some embodiments the step of generating the mapped blank spectrum comprises: generating an unscaled mapped blank spectrum by mapping the blank spectrum to the sample spectrum based on the cross-correlation, and scaling intensity values of the unscaled mapped blank spectrum based on difference in intensity values between the unscaled mapped blank spectrum and the sample spectrum, to generate the mapped blank spectrum. By scaling the intensity values of the unscaled mapped blank spectrum, the mapped blank spectrum may be more closely fitted to the sample spectrum based on the cross-correlation. Accordingly, artificial noise resulting from the subtraction process may be further reduced and/or eliminated.

The method of the first aspect is performed using an optical spectrometer. In particular, the method of the first aspect may be performed using an optical emission spectrometer. As such, the method of the first aspect may be a method of optical emission spectrometry.

In some embodiments, obtaining a blank spectrum comprises obtaining a "gas blank" spectrum of the plasma source. That is to say, the blank spectrum is obtained by using the optical spectrometer to measure a spectrum (a gas blank spectrum) of the plasma source without any sample present in the optical spectrometer. As such, in some embodiments, the plasma source of the optical spectrometer may be used to provide the blank spectrum which is subtracted from the sample spectrum. As such, methods according to the first aspect may be used to reduce or eliminate structured background radiation associated with the plasma source from the sample spectrum.

In some embodiments, obtaining the sample spectrum comprises introducing a solution comprising a solvent and the sample into the optical spectrometer. As such, the method of optical spectroscopy according to the first aspect may be used with a range of different samples and solvents. Of course, in other embodiments, the sample may be provided in a gaseous form or other forms of sample known for use in optical spectroscopy.

In some embodiments, obtaining the blank spectrum comprises introducing a solution comprising the solvent for the sample without presence of the (sample) solute into the optical spectrometer. That is to say, the blank spectrum may be obtained by using the optical spectrometer to measure a spectrum of the solvent. As such, methods according to the first aspect may use a blank spectrum based on the solvent of the sample solution in order to eliminate structured background radiation associated with the solvent of the sample from the sample spectrum. Where the optical spectrometer includes a plasma source, the blank spectrum based on the solvent of the sample may be eliminate structured background radiation associated with both the plasma gases and the solvent.

In some embodiments, determining the cross-correlation of the sample spectrum and the blank spectrum comprises determining a phase correlation of the sample spectrum and the blank spectrum. The phase correlation may be used in order to identify a transformation that closely maps the blank spectrum to the sample spectrum. Calculation of the phase correlation provides a method for estimating the relative translative offset between two similar data sets (i.e. a linear transformation). In the case of the blank spectrum and the sample spectrum, the correlated nature of the structured background radiation present in the sample spectrum and the blank spectrum allows for the cross correlation (e.g. phase correlation) to provide an estimate for a translation of the blank spectrum to generate the mapped blank spectrum. The phase correlation is a specific form of cross-correlation which can be used for image correlation/image registration. The phase-correlation is highly sensitive to even the smallest perturbations between images, including when the differences between the images are on the sub-pixel level. As such, use of the phase correlation can allow for the correction of sub-pixel degrees of drift between the blank spectrum and the sample spectrum.

In some embodiments, the sample spectrum comprises a two-dimensional array of first spectrum values. In some embodiments, the blank spectrum comprises a two-dimensional array of second spectrum values. Such two-dimensional arrays of values may be generated by a suitable detector, such as a CMOS detector chip. Accordingly, methods according to the first aspect may be used in conjunction with an optical spectrometer comprising an echelle grating that is configured to produce an echelle spectrum. The method of the first aspect uses a cross-correlation (e.g. a phase correlation) of the two-dimensional images (blank spectrum and sample spectrum) to determine a transformation for the generation of the mapped blank spectrum. By using a cross-correlation, the two-dimensional image representative of the mapped blank spectrum may closely match the sample spectrum in order to reduce or eliminate any artificial noise when subtracting the blank spectrum from the sample spectrum.

In some embodiments, prior to subtracting the mapped blank spectrum from the sample spectrum, the sample spectrum and the blank spectrum may be interpolated. The mapped blank spectrum may be generated based on the interpolated blank spectrum. As such, the background corrected sample spectrum may be calculated from the (interpolated) mapped blank spectrum and the interpolated sample spectrum. It is noted that interpolation as used in the invention is interpolation in space, as opposed to interpolation in time. Although, interpolation in time may also be used in methods and apparatus according to the present disclosure, the interpolation of spectrum values as described herein is interpolation in space.

The interpolation can be carried out producing an almost arbitrary number of intermediate (that is interpolated) spectrum values (e.g. first spectrum values of the sample spectrum, second spectrum values of the blank spectrum, mapped blank spectrum values) between two original spectrum values. In some embodiments, only a single intermediate value may be used, thus reducing the computational effort at the expense of a smaller increase in accuracy. In some embodiments, a plurality of intermediate values may be used, for example between 5 and 20 intermediate values, such as 10 intermediate values, although numbers greater than 20 may also be used. In some embodiments, spline interpolation, or polynomial interpolation may be used.

In some embodiments, the sample spectrum and the blank spectrum each comprise an expected wavelength of an analyte of interest for the sample. Accordingly, methods according to the first aspect may be used to reduce or eliminate structured background radiation in a sample spectrum around a wavelength corresponding to an analyte of interest for a sample. By eliminating such structured background radiation in a manner which does not artificially increase the noise present in the subtracted signal, the signal to noise ratio of any light present in the sample spectrum at the wavelength of interest may be increased. Thus, methods according to the first aspect may be used to detect the presence of the analyte of interest in a sample at relatively low signal intensities.

In some embodiments, the cross-correlation of the sample spectrum and the blank spectrum is determined based on a region of the sample spectrum and a corresponding region of the blank spectrum where only the structured background radiation is present (i.e. regions where there is an absence of a sample signal). As such, the cross-correlation between the sample spectrum and the background spectrum may be determined more accurately, as the calculation is not influenced by the sample signal.

According to a second aspect of the disclosure, an optical spectrometer for analysing a sample is provided. The optical spectrometer comprises a detector and a controller. The controller is configured to cause the spectrometer to obtain a sample spectrum of the sample using the detector, obtain a blank spectrum using the detector, the blank spectrum comprising structured background radiation which is correlated with the sample spectrum, determine a cross-correlation of the sample spectrum and the blank spectrum, generate a mapped blank spectrum by mapping the blank spectrum to the sample spectrum based on the cross-correlation, and subtract the mapped blank spectrum from the sample spectrum to generate the background corrected sample spectrum.

The optical spectrometer according to the second aspect may be used to perform the method according to the first aspect of the disclosure. As such, the optical spectrometer of the second aspect may incorporate any of the optional features of the first aspect described above.

According to a third aspect of the disclosure, a computer program is provided. The computer program comprises instructions which, when executed, causes an optical spectrometer according to the second aspect to carry out a method of optical spectrometry in accordance with the first aspect of the disclosure.

According to a fourth aspect of the disclosure, a computer-readable medium having stored thereon the computer program of the third aspect is provided.

BRIEF DESCRIPTION OF THE FIGURES

Embodiments of the disclosure will now be described, by way of example only, with reference to the accompanying drawings in which.

DETAILED DESCRIPTION

Figure 1:
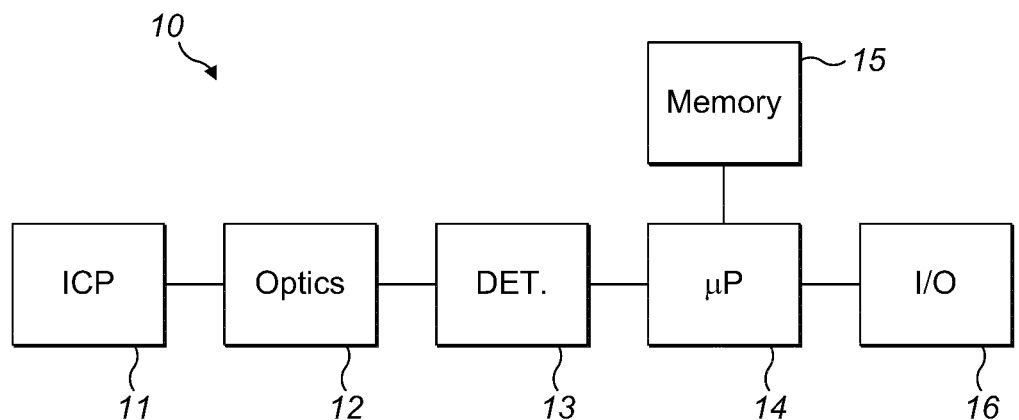
FIG. 1 shows a block diagram of an optical spectrometer according to an embodiment of the disclosure.

According to an embodiment of the disclosure an optical spectrometer 10 is provided. The optical spectrometer 10 is configured to perform a method of optical spectroscopy. The optical spectrometer 10 is shown schematically in the block diagram of FIG. 1. The optical spectrometer 10 comprises a light source 11, an optical arrangement 12, a detector 13, a processor 14, a memory 15, and an input/output (I/O) unit 16.

The optical spectrometer 10 may, in some embodiments be an optical emission spectrometer. The optical emission spectrometer may be configured to perform a method of optical emission spectrometry in accordance with embodiments of the disclosure.

The light source 11 may be a plasma source, for example an inductively coupled plasma (ICP) source.

The optical arrangement 12 may comprise an echelle grating and a prism (and/or a further grating). The optical arrangement 12 may be configured to produce an echelle spectrum of the light produced by the light source 11. The optical arrangement 12 may be configured to direct an image of the two-dimensional echelle spectrum to be formed on the detector 13.

The detector 13 may be a detector array such as a CCD (charged coupled device) array, for example. A typical detector array may have at least approximately 1024×1024 pixels (1 megapixel). The detector array may be a rectangular, or square detector array. The detector array 13 may be configured to produce spectrum values corresponding with the detected amount of light of the echelle spectrum, and configured to transfer the spectrum values to the processor 14.

The processor 14 may comprise a commercially available microprocessor and the like. The memory 15 may be a suitable semiconductor memory and may be used to install instructions to allow the processor 14 to cause the spectrometer 10 to carry an embodiment of the method according to the present disclosure.

Figure 2:
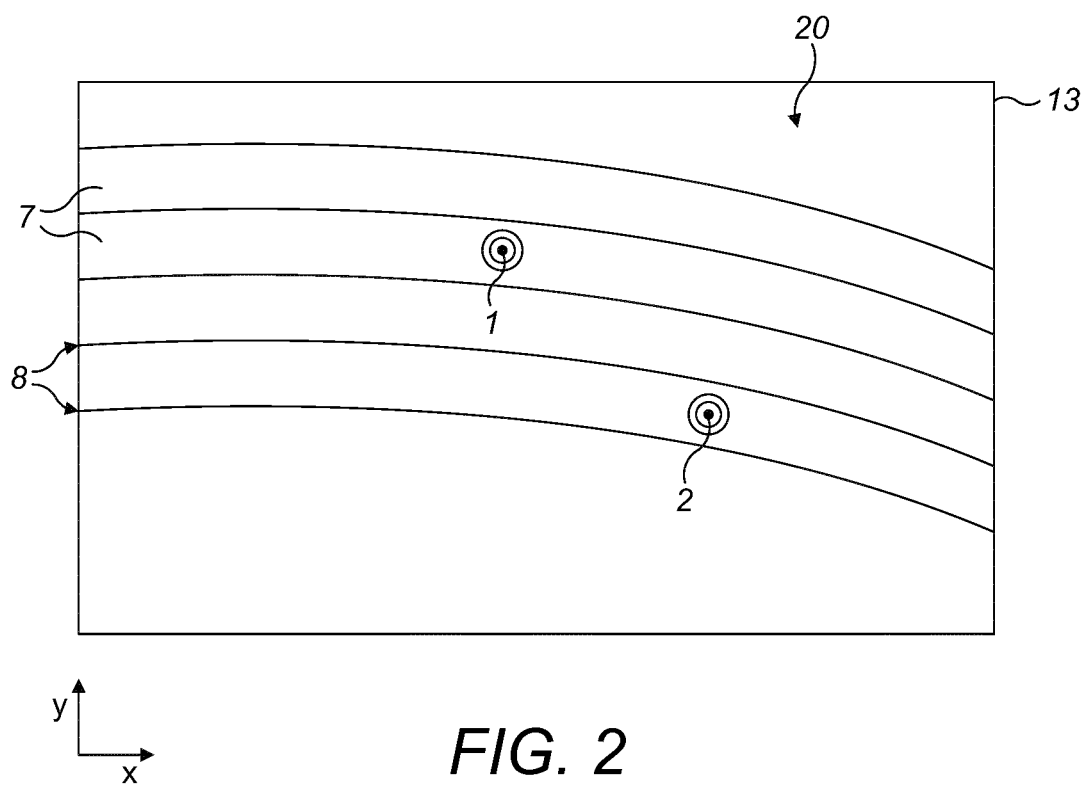
FIG. 2 shows a schematic diagram of a detector of an optical spectrometer according to an embodiment of the disclosure.

A detector array 13 on which an echelle spectrum has been imaged is shown schematically in FIG. 2. The echelle spectrum 20 of FIG. 2 comprises a plurality of so-called orders 7 which extend approximately horizontally in FIG. 2. That is, the orders 7 extend approximately in a first direction of the detector array 13. In FIG. 2, the first direction may be referred to as the x-direction. Accordingly, the orders 7 extend approximately perpendicularly to a second direction of the detector array. In the embodiment of FIG. 2 the second direction may be referred to as the y-direction. The orders in an echelle spectrum are typically slightly curved, such that the degree to which the orders are parallel or perpendicular to the first and second direction may vary over the echelle spectrum.

In the example of FIG. 2, the first direction is parallel to the longer side of the detector array 13 while the second direction (y-direction) is parallel to the shorter sides. The orientation of the detector array 13 may be chosen so as to best fit the two-dimensional spectrum imaged on the detector array. Of course, in principle the first and second directions of the detector array can be interchanged. The detector array 13 comprises an array of detector elements, or pixels which produce output signals representing the detected spectrum values.

Each order 7 represents an area of higher intensity light and consequently higher spectrum values. The orders 7 are separated by valleys or troughs 8 of lower light intensity, and hence lower spectrum values. An echelle spectrum typically comprises one or more peaks which are characteristic of a certain substance, or analyte of interest. For instance, when using an inductively coupled plasma source to produce an echelle spectrum, there is typically a peak representing $CO_2$. In FIG. 2, a first peak 1 and a second peak 2 are schematically represented. In an actual echelle spectrum more than two peaks will be typically present. Each peak is located in an order and constitutes a maximum of that order, at least locally. It can be seen that each peak extends in both the first direction (the x-direction in FIG. 2) and the second direction (the y-direction in FIG. 2). It is noted that in typical embodiments peaks may have a length and a width of only a few pixels, for instance 3 to 5 pixels.

Different substances will produce peaks in different locations of the optical spectrum. In principle, those locations are fixed for each substance, so that a substance or analyte of interest can be identified on the basis of the location of its peak in the spectrum. However, in practice those locations are subject to drift caused for example by temperature differences. It will be understood that parts of the optical spectrometer will expand or contract where their temperature varies, if only slightly. In echelle optics, such relatively small changes in the geometry may cause clearly measurable changes in the location of the peaks in the echelle spectrum 7. Thus, both the location and the intensity of a peak may be subject to some noise due to temperature-related drift. This problem is particularly acute where the dimensions of the peaks are typically small relative to the pixel size. Moreover, in some experiments the sample signal representative of the analyte of interest may be relatively small compared to the magnitude of the structured background radiation. In such cases, the sample signal representative of the analyte of interest can be masked by noise due to temperature drift. As mentioned above, a peak may extend over only four pixels, for example. So if the actual peak representative of the analyte of interest drifts over a distance of half a pixel, the measured location of the peak may move over an entire pixel. In addition, the small size of the peaks representative of the analyte of interest relative to the pixels, easily gives rise to errors when determining the peak intensity, as further discussed below.

Although the embodiment of FIG. 1 relates to a detector 13 on which an echelle spectrum is imaged, other embodiments of the disclosure may use different forms of optics and detectors. For example, in some embodiments a spectrometer with only 1 grid (or prism) may be used. For example, a Czerny-Turner-type spectrometer or a Rowland-type spectrometer. As such, the spectrometer may image a spectrum as a single line on a detector, or may image a spectrum on to an array of single detectors.

The optical spectrometer 10 shown in FIG. 1 may be used to perform a method of optical spectroscopy. The method of optical spectroscopy according to an embodiment of the disclosure may be used to analyse a sample. For example, the optical spectrometer may be used to analyse a sample to identify the presence of an analyte of interest within the sample.

Figure 3:
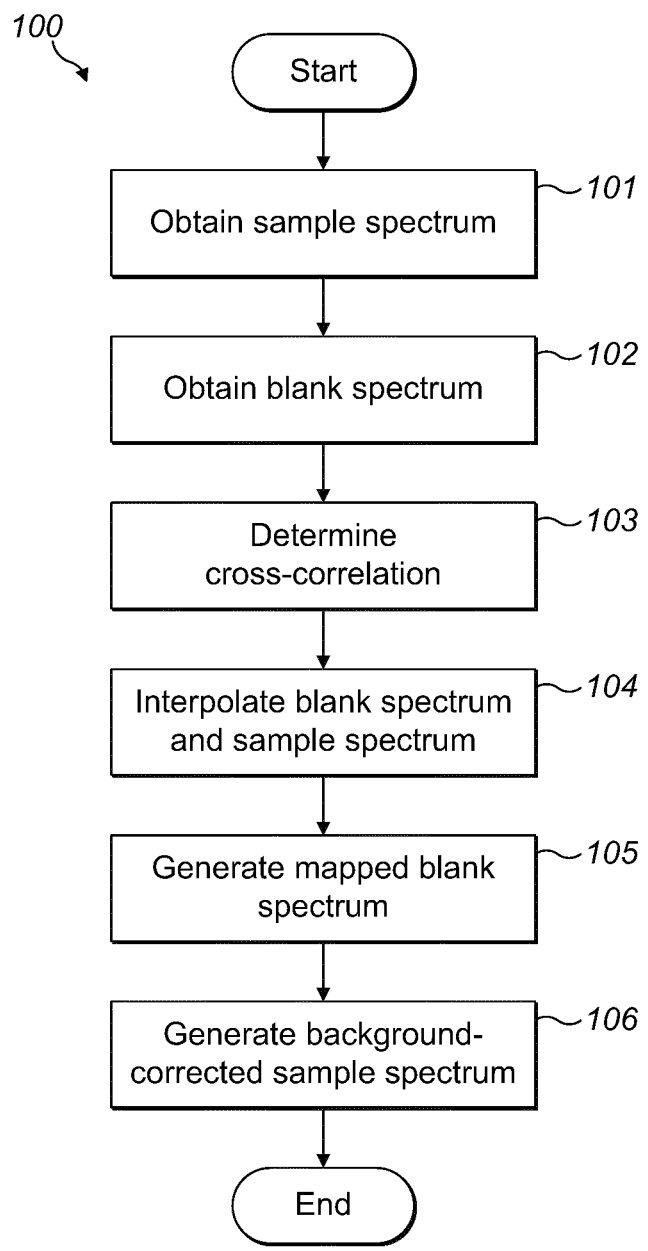
FIG. 3 shows a flow chart of a method according to an embodiment of the disclosure.

According to a method 100 of an embodiment of this disclosure, a sample is analysed using an optical spectrometer 10. For example, the method 100 may be performed using the optical spectrometer 10 of FIG. 1. A block diagram of the method 100 is shown in FIG. 3.

In step 101 of the method 100 a sample spectrum is obtained. The sample spectrum may be obtained using the optical spectrometer 10 of FIG. 1. In order to obtain the sample spectrum, the optical spectrometer 10 may be provided with a sample solution comprising the sample and a solvent in which the sample is dissolved. As such, various different types of sample may be analysed using the optical spectrometer by dissolving them in a suitable solvent. Of course, in other embodiments of the disclosure the sample may be provided to the optical spectrometer 10 by a different method. For example, the sample may be provided in a gaseous form in some embodiments. For the optical spectrometer 10 of FIG. 1 the sample spectrum may be obtained by illuminating the sample solution using the light source 11 and directing the light emitted from the sample solution through the optical arrangement 12 to the detector 13. The detector 13 detects the echelle spectrum representative of the light emitted from the sample solution and sends information representative of the spectral values to the processor 14. The spectral values detected by each pixel of the detector 13 are used by the processor 14 to construct a sample spectrum. The sample spectrum comprises a plurality of intensity values for a range of wavelengths over which the optical spectrometer 10 is configured to analyse the sample.

In step 102 the optical spectrometer 10 obtains a blank spectrum comprising structured background radiation which is correlated with the sample spectrum. The blank spectrum may be obtained in a similar manner to the sample spectrum using the optical spectrometer 10. While the embodiment of FIG. 3 shows step 102 performed after step 101, in other embodiments the steps may be performed the other way round.

In step 102 the blank spectrum is obtained without measuring the sample. For example, in some embodiments the blank spectrum may be obtained by introducing a blank solution into the spectrometer 10. The blank solution may comprise the solvent used in the sample solution but not the sample. As such, the optical spectrometer 10 may obtain a blank spectrum which includes structured background radiation representative of the light source 11 and the solvent of the sample solution. By obtaining a blank spectrum with such structured background radiation, the structured background radiation present in the sample spectrum resulting from the light source 11 and the solvent of the sample solution may be removed.

In some embodiments, the blank spectrum obtained in step 102 may be a gas blank spectrum. A gas blank spectrum may be obtained by measuring the optical emissions from the light source 11 using the detector 13. As such, the gas blank spectrum comprises light from the light source 11 (ICP source). Obtaining a gas blank spectrum does not require any further solution to be introduced into the spectrometer 10. Accordingly, the gas blank spectrum may contain information regarding structured background radiation present in the sample spectrum resulting from the light source 11. In particular, a gas blank spectrum may be particularly useful for removing structured background radiation of the light source 11 when the light source is a plasma source.

The blank spectrum obtained should be correlated with the sample spectrum such that the cross-correlation based mapping process of this disclosure can produce a transformation which allows the two spectra to closely overlap. In practice, this means that the blank spectrum should be obtained using experimental conditions which are similar to the experimental conditions used to obtain the sample spectrum. For the plasma spectrometer of FIG. 1, the conditions of the ICP source (e.g. plasma power, gas flow etc.) should be maintained for both measurements. Ideally, the blank spectrum and the sample spectrum should be obtained sequentially to reduce the amount of drift that may occur. However, in some embodiments, the experimental conditions used to obtain the blank spectrum and the sample spectrum may vary and still allow for a suitable mapped blank spectrum to be generated. Variation in experimental conditions is discussed in more detail below.

Figure 4:
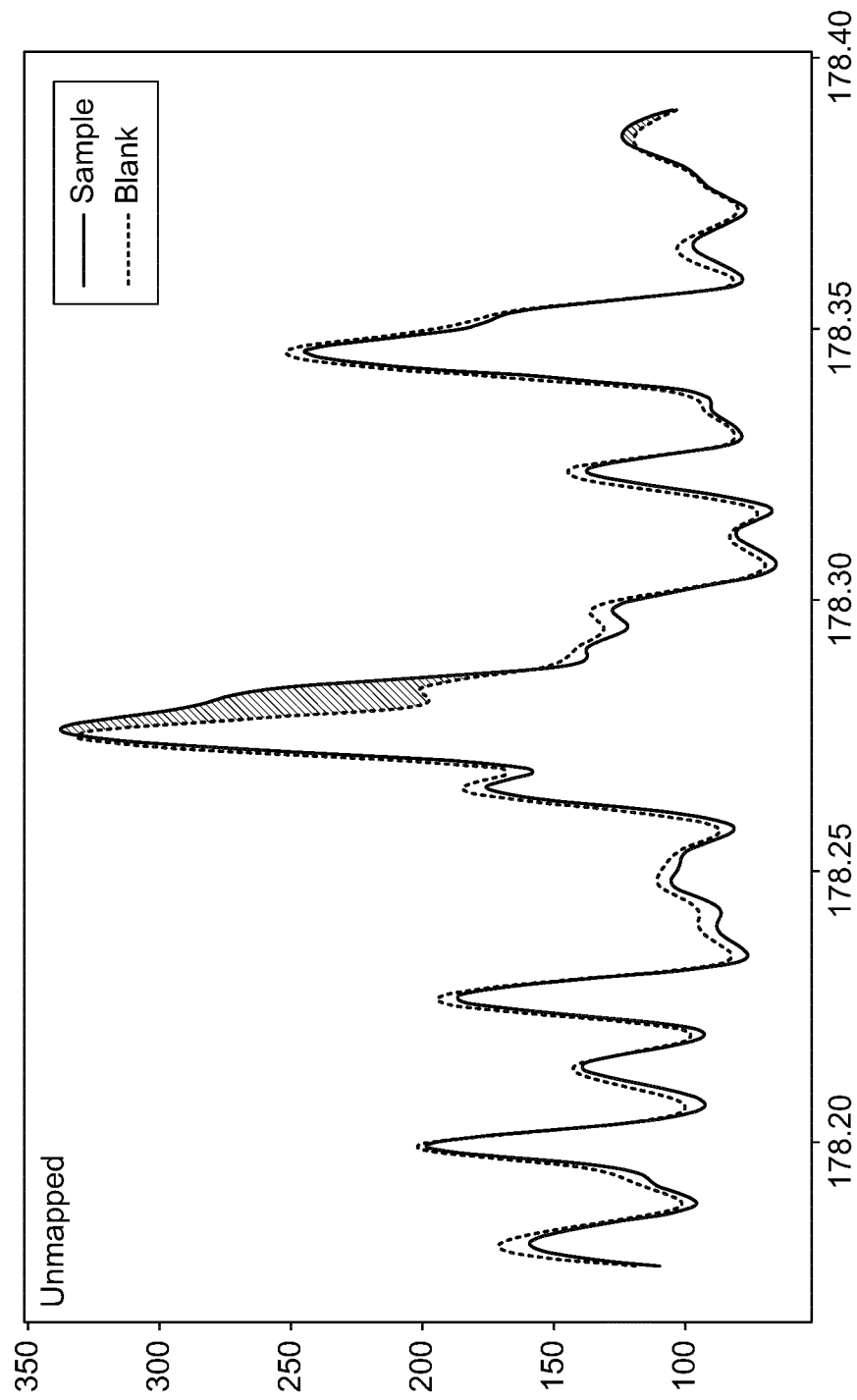
FIG. 4 shows a graph of a blank spectrum and a sample spectrum obtained as part of a method according to an embodiment of the disclosure.

The sample spectrum and the blank spectrum obtained by the spectrometer 10 are processed by the processor 14. FIG. 4 shows a graph of a portion of a sample spectrum and a portion of a blank spectrum obtained by the spectrometer in steps 101 and 102 respectively. As will be appreciated from FIG. 4 each of the sample spectrum and the blank spectrum comprise a number of peaks. Many of the peaks in the sample spectrum and the blank spectrum are located in a similar position and are of a similar magnitude. These peaks are the result of structured background radiation which is highly correlated between the sample spectrum and the blank spectrum. It will be appreciated that the plurality of peaks do not exactly overlap between the sample spectrum and blank spectrum. The cause of the peaks not exactly overlapping is due to random noise present in both the sample spectrum and the blank spectrum and also due to thermal drift.

The largest peak present in FIG. 4, located towards the centre of the diagram, is a peak which is representative of an analyte of interest for the sample. In FIG. 4, it can be seen that the sample spectrum for this peak has a slightly different shape to that of the blank spectrum in which the analyte of interest was not present. As such, it will be appreciated that it is challenging to distinguish the presence of the analyte of interest from the structured background radiation as a peak associated with the structured background radiation is present at a similar wavelength to the wavelength associated with the analyte of interest.

Figure 5:
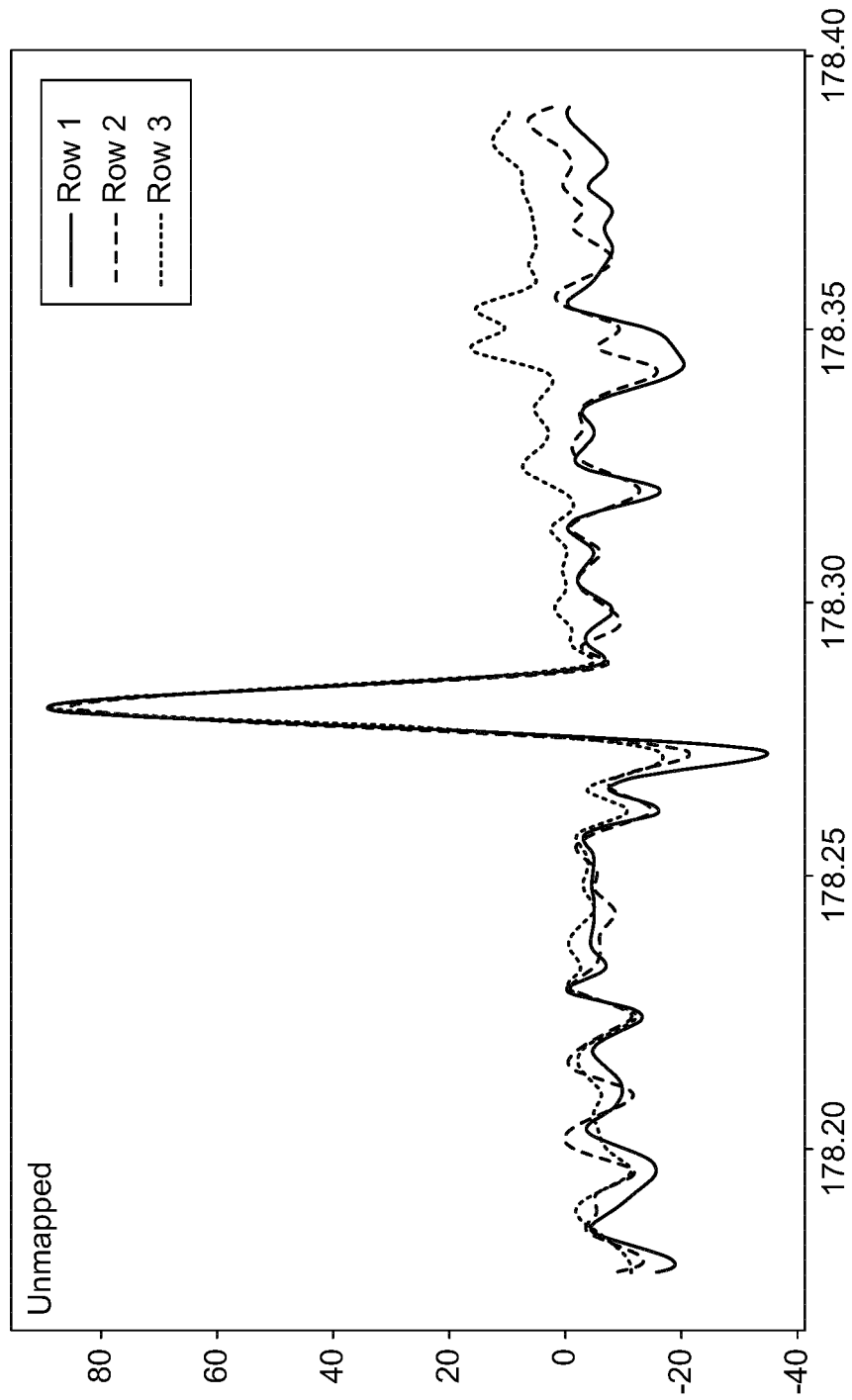
FIG. 5 shows a graph of spectra including artificial noise generated by subtracting blank spectra from associated sample spectra.

FIG. 5 shows a graph in which as-measured blank spectra have been subtracted from corresponding sample spectra. FIG. 5 shows a plurality of subtracted spectra for different rows of the detector array, each row within the same order 7 (see FIG. 2) of the echelle spectrum. In FIG. 5, the subtraction process has been performed without any mapping of the blank spectrum. It would normally be expected that for two perfectly correlated spectra, the resulting subtracted spectra would include signals relating to the sample present in the sample spectrum and randomly generated noise. In each of the rows for which the subtraction process has been performed, the subtraction process has resulted in an increase in artificial noise. In the spectra of FIG. 5, the signal relating to the analyte of interest is present but the remaining wavelengths are not randomly generated noise.

Rather, for example as shown in row 3, the signal away from the sample peak includes a signal which increases in intensity with wavelength. Such artificial noise is a result of the subtraction process where the blank spectrum does not fully overlap with the sample spectrum. As such, the central peak in each of the subtracted spectra is also subject to the same artificial noise. Introducing such artificial noise into the subtracted spectrum may make it more difficult to detect or distinguish peaks which belong to the analyte of interest and peaks in the subtracted spectrum which are a result of artificial noise.

In order to determine a background-corrected sample spectrum, the method 100 according to an embodiment of the disclosure generates a mapped blank spectrum to be used in the subtracting process. As part of the process of generating the mapped blank spectrum, in step 103 the method 100 determines a cross-correlation for the blank spectrum and the sample spectrum. In the embodiment of FIG. 3, the cross-correlation determined may be a phase correlation. The cross-correlation (phase correlation) may be computed using the images recorded by the detector array or from the sample spectrum and blank spectrum calculated by the processor 14. The cross-correlation may be determined based on a portion of the blank spectrum and portion of the sample spectrum (i.e. a sub array of the blank spectrum, and a corresponding sub array of the sample spectrum having the same wavelength range). As the echelle spectra recorded by the detector array 13 may be two-dimensional images, determining a translation to map the blank spectrum to the sample spectrum using a phase correlation can be advantageous, as the phase correlation can identify the complex translation required to map the images to each other. For example, a sample spectrum may be recorded as by the detector 14 a first image S and a blank spectrum may be recorded as a second image B. Each of the first and second images has a width (x-axis) of W and a height (y-axis) of H. For example, H may be 5 pixels corresponding to 5 rows of the detector over which an order 7 may be imaged. As such, each of the first and second images may have a dimension of W×H pixels.

In order to select suitable sub-arrays of the blank spectrum and the sample spectrum, the processor may identify a pixel in each of the first and second images S, B corresponding to the wavelength where a signal peak corresponding to an analyte of interest is expected to be present. The processor then selects a portion of each of the first and second images as the respective sub-arrays. For example, the processor may remove a region from each of the first and second images centred around the pixel of interest to obtain a sub array of the blank spectrum B', and a sub array of the sample spectrum S'. For example, the processor may remove a region comprising the pixel of interest and +/−5 pixels on the x-axis from the pixel of interest in both S and B. Effectively, the processor may selectively remove a portion of each of the first and second images where an analyte of interest is expected to be imaged. Accordingly, sub-arrays S' and B' may be obtained, each sub-array having dimensions of W−11×H pixels. Regions of the sample spectrum and the blank spectrum comprising the analyte of interest may be selectively removed to improve the cross-correlation calculation. As such, the cross-correlation calculation may be performed by comparing only regions of the images that where the background signal and noise is present (i.e. where there is an absence of a sample signal).

It will be appreciated that the sub-arrays S' and B' each effectively comprise two regions spaced either side of the central region which was selectively removed. In some embodiments, a cross-correlation may be calculated based on the complete sub-arrays S', B'. In other embodiments, a cross-correlation may be calculated for each region of the two sub-arrays S', B' separately. The cross-correlation for each region may then be averaged to determine an overall cross-correlation for the two sub-arrays S', B'.

Various methods for computing the phase correlation of two images are known to the skilled person. For example, the phase correlation of two images recorded by a detector array may be computed using fast Fourier transforms (FFTs).

When computing the phase correlation of the blank spectrum and the sample spectrum, (or a sub-array of the sample spectrum and a sub-array of the blank spectrum), it may be desirable to frame both images in a two-dimensional window. Applying a window function to each of the images before computing the phase correlation reduces the significance of the pixels around the boundaries of each image when computing the phase correlation. There are a number of different window functions that can be used for signal processing techniques such as computing the phase correlation.

The calculation of the phase correlation of two data sets (e.g. two spectra) is well known to the skilled person. For example, the skilled person understands that the phase correlation can be calculated in the Fourier domain by computing the discrete Fourier transforms of the sample spectrum and the blank spectrum.

As such, in the method 100 the phase correlation may be calculated by computing an FFT of the sample spectrum and computing an FFT of the blank spectrum. Each of the blank spectra and the sample spectra may be been subjected to a window function prior to computing the respective FFT as discussed above. The cross-power spectrum may then be calculated by taking the complex conjugate of either the FFT of the sample spectrum or the blank spectrum and then multiplying the complex conjugate with the other FFT element-wise and normalising this product element-wise. The normalised cross-correlation can then be obtained by applying the inverse (fast) Fourier transform (IFFT) to the cross-power spectrum. As such, the cross-correlation (or phase correlation in this case) is a function in two-dimensional space. A suitable transformation for the blank spectrum may be identified by determining the location of the maxima in the cross-correlation space. In some embodiments, interpolation may be used to estimate the peak location in the cross-correlation to a non-integer value. Various methods for interpolating between subpixels (subpixel interpolation) are known to the skilled person. For example, parabolic interpolation may be used to estimate the peak location in the cross-correlation space.

While in the embodiment of the method 100 a phase-correlation is calculated, in other embodiments, the cross-correlation may be used. For example, where the detector is a line detector (i.e. a 1-Dimensional detector), the cross-correlation may be used to calculate a suitable transformation.

In some embodiments, such as in the method 100, step 104 may be provided in which the blank spectrum and the sample spectrum are interpolated. The blank spectrum and the sample spectrum may be interpolated prior to computation of the cross-correlation, or after the computation of the cross-correlation (as per method 100). Interpolating the blank spectrum and the sample spectrum allows the peak values present in the blank spectrum and the sample spectrum to be more accurately located. As noted above, methods for subpixel interpolation are well known to the skilled person. In some embodiments, a plurality of intermediate values may be used, for example between 5 and 20 intermediate values, such as 10 intermediate values, although numbers greater than 20 may also be used.

In step 105, the mapped blank spectrum is generated. The mapped blank spectrum is generated based on the cross-correlation. More specifically, generating the mapped blank spectrum comprises performing a linear transformation on the blank spectrum. The linear transformation applied to the blank spectrum is based on the peak of the cross-correlation identified previously. By performing such a linear transformation, the blank spectrum is translated such that it substantially overlaps the sample spectrum. More specifically, the structured background radiation present in the blank spectrum is mapped such that it substantially overlaps the structured background radiation present in the sample spectrum.

In some embodiments, step 105 of generating the mapped blank spectrum may comprise a step of generating an unscaled mapped blank spectrum by mapping the blank spectrum to the sample spectrum based on the cross-correlation. Whilst in some embodiments the unscaled mapped blank spectrum may be used as the mapped blank spectrum, the overlap between the unscaled mapped blank spectrum and the sample spectrum may be further improved by scaling the intensity values of the unscaled mapped blank spectrum. As such, the overlap may be improved by a two-stage transformation process in which a first linear transformation is applied based on the cross-correlation, followed by a second transformation stage in which the intensity values of the unscaled mapped blank spectrum are scaled.

In some embodiments, step 105 may also comprise scaling the blank spectrum in space prior. The blank spectrum may be scaled in space prior to generating the unscaled mapped blank spectrum. That is to say, the blank spectrum may be scaled in space prior to calculation of the cross-correlation. It is possible that thermal effects may cause changes in the optics of a spectrometer which result in the features of the spectra having different sizes (i.e. an image magnification or shrinkage effect). That is to say, the same peak in the sample spectra and the blank spectra may have different widths. Such an effect may cause a sub-pixel difference in feature size, although for many embodiments this effect is not statistically significant. If significant, the effect can be corrected by applying a further scaling factor to the blank spectrum to scale the blank spectrum in space such that at a given feature size it more closely matches the size (but not necessarily the position) of the same feature the in sample spectrum.

The scaling of the intensity values of the unscaled mapped blank spectrum may be determined based on the differences in intensity values between the unscaled mapped blank spectrum and the sample spectrum (i.e. the residuals). The scaling applied may be constant offset value, or multiplying all intensity values by a constant factor, or a combination of a constant offset value and multiplication of intensity values by a constant factor. The scaling to be applied may be calculated based on the residuals of the unscaled mapped spectrum relative to the sample spectrum. The scaling to be applied may be chosen such that the squared errors of the differences are minimised. Various methods for calculating such a scaling are known to the skilled person. As such, the mapped blank spectrum may be generated using a combination of a transformation from a cross-correlation and a scaling process based on minimisation of squared errors.

Figure 6:
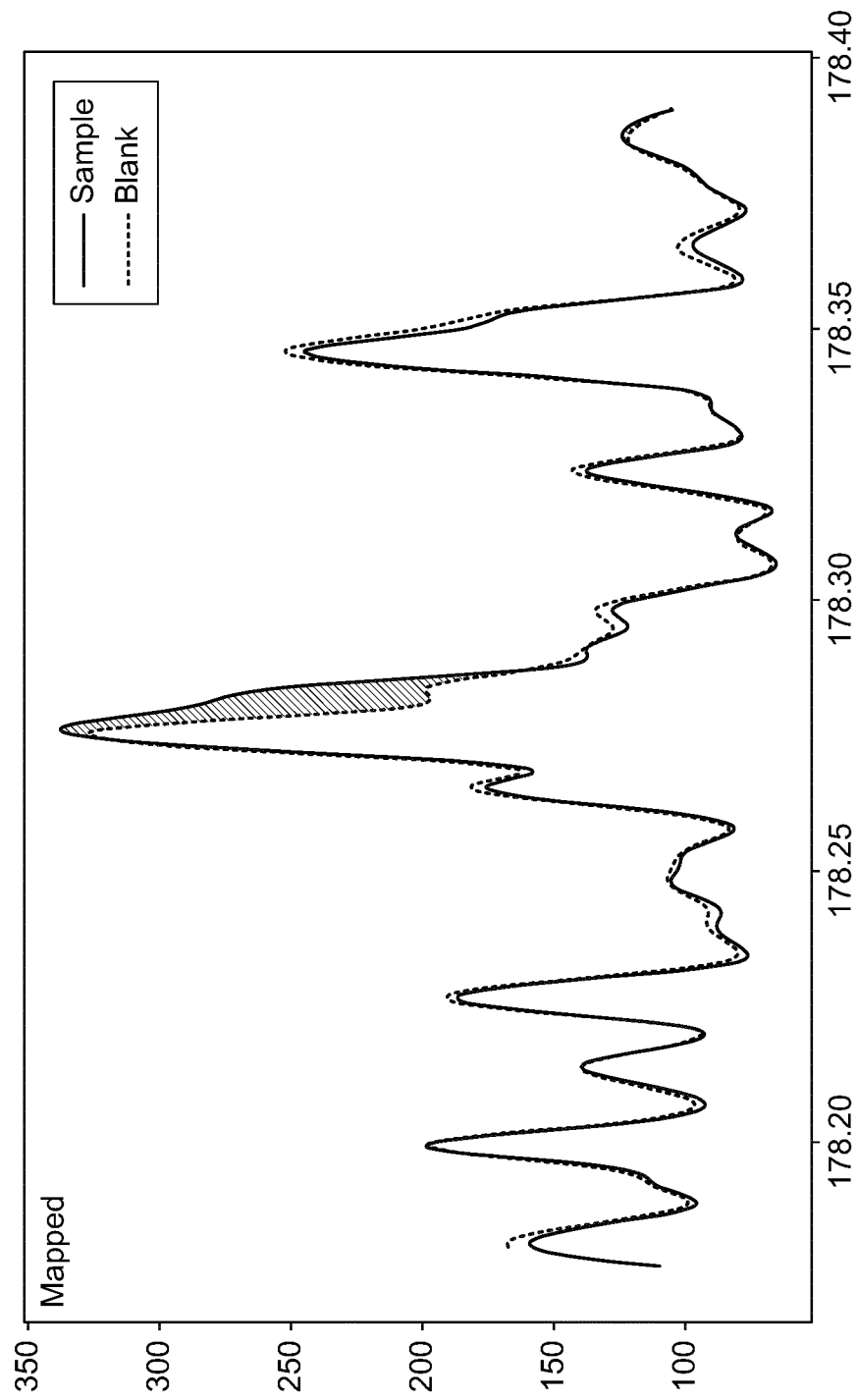
FIG. 6 shows a graph of the sample spectra of FIG. 3 and a mapped blank spectrum generated in accordance with an embodiment of the disclosure.

FIG. 6 shows a graph of the sample spectrum of FIG. 3 and a mapped blank spectrum which has been generated from the blank spectrum of FIG. 3.

Figure 7:
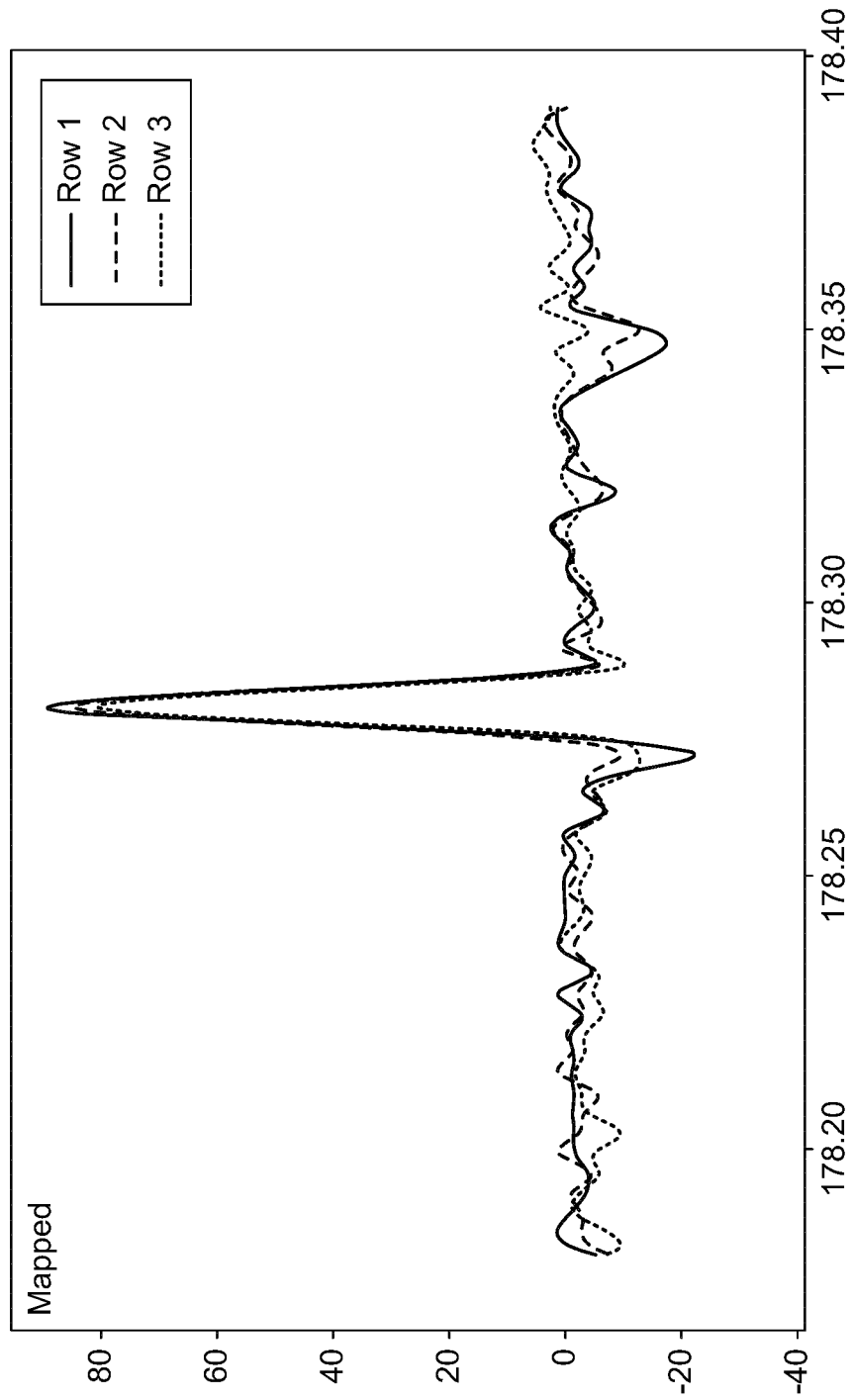
FIG. 7 shows a graph of background corrected spectra generated in accordance with an embodiment of the disclosure.

In step 106, the background-corrected sample spectrum is generated. The background-corrected sample spectrum is generated by subtracting the mapped blank spectrum from the sample spectrum. FIG. 7 shows an example of background-corrected spectra for three rows of a detector array 13. As such, FIG. 7 shows the effect of the mapping process according to embodiments of this disclosure in contrast to the spectra of FIG. 5. As can be seen in FIG. 7, the structured background radiation in each of the spectra has been subtracted such that the each of the spectra comprises a signal relating to the analyte of interest and substantially random noise elsewhere. It will be appreciated that the magnitude of noise present in the spectra of FIG. 7 is reduced relative to the noise present in FIG. 5. As such, methods according to embodiments of this disclosure provide background-corrected sample spectra having an improved signal-to-noise ratio. Such improved signal-to-noise ratios can provide an optical spectrometer 10 having an improved limit of detection.

Figure 8:
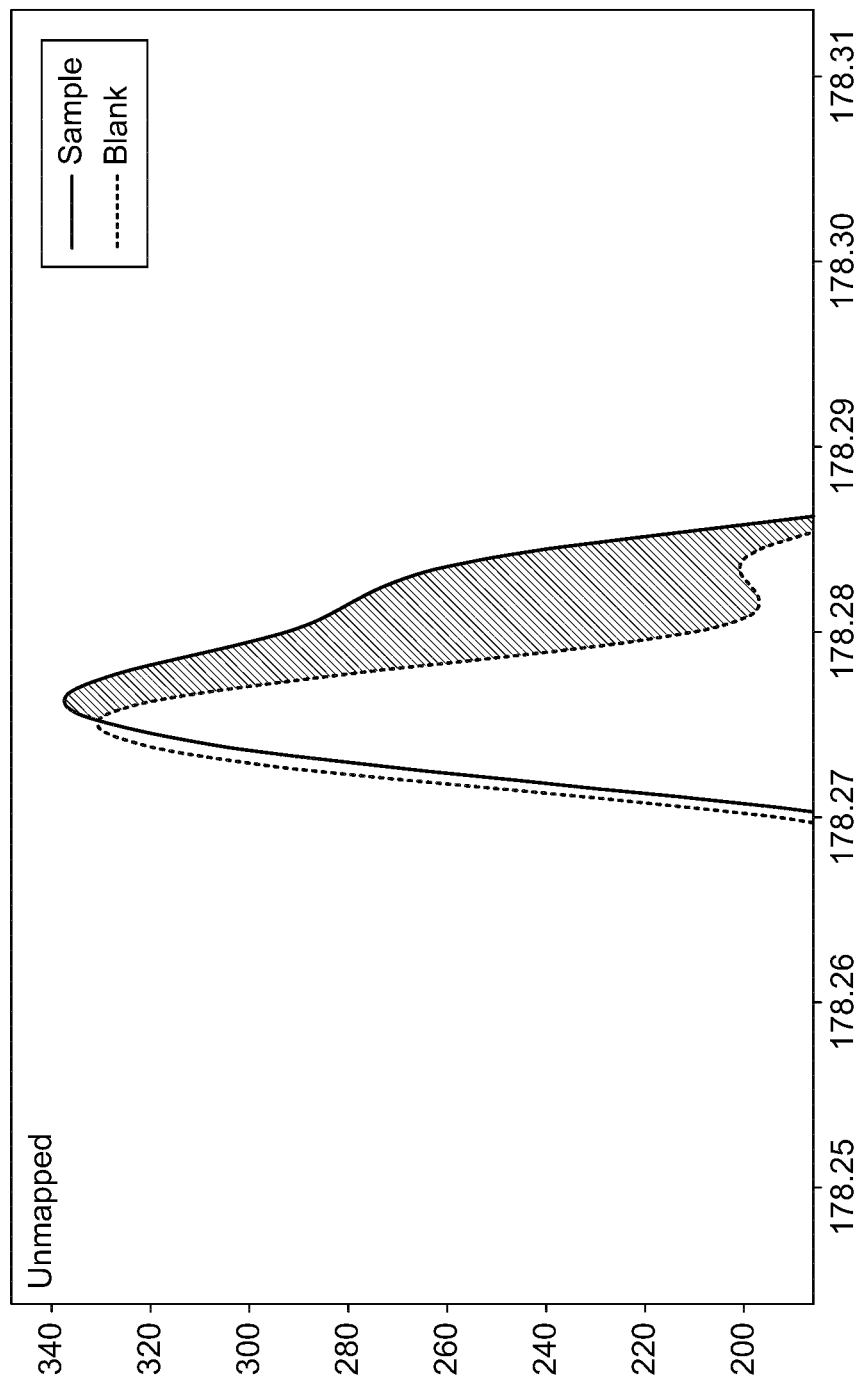
FIG. 8 shows a detailed view of a peak associated with an analyte of interest in FIG. 4.
Figure 9:
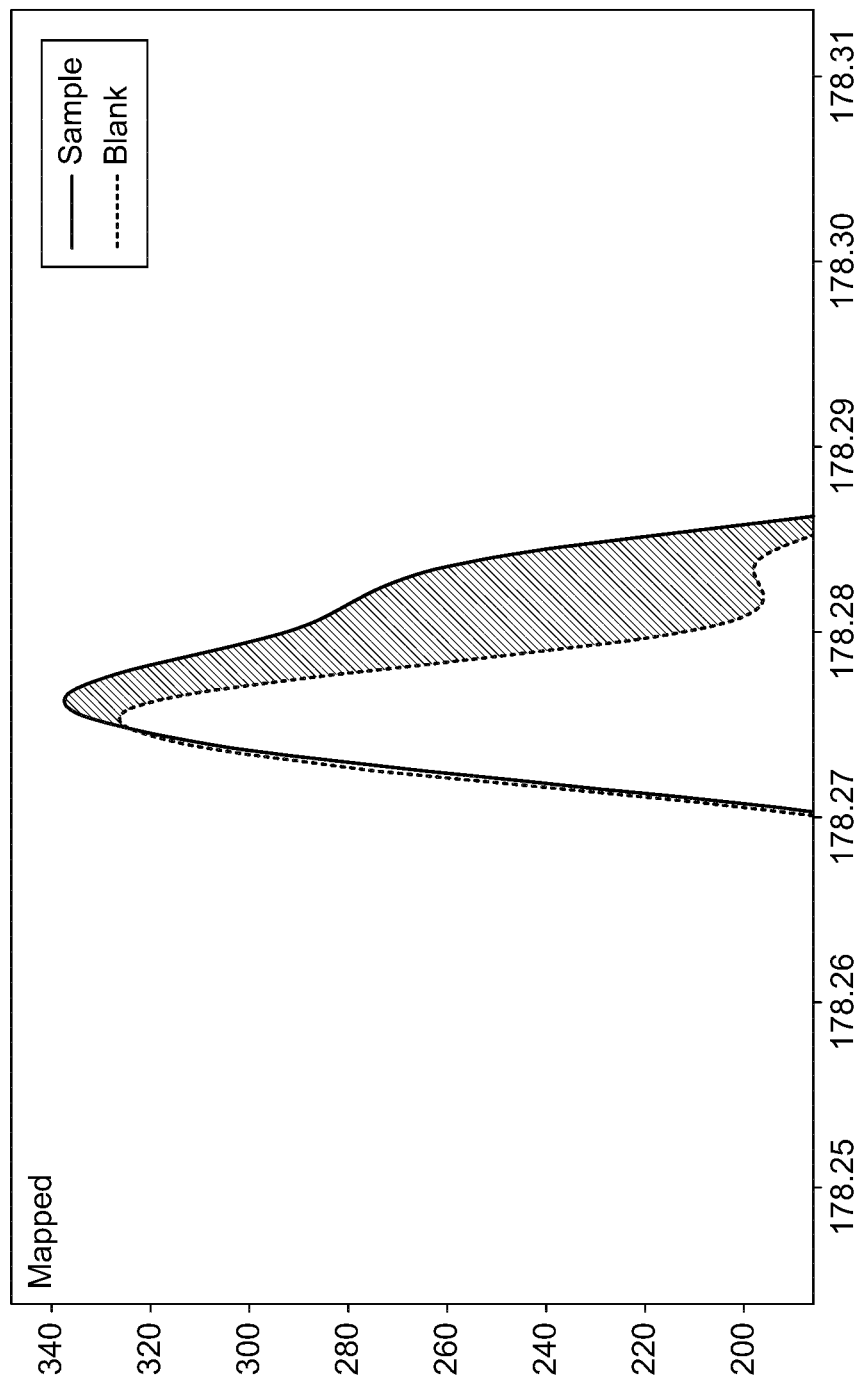
FIG. 9 shows a detailed view of a peak associated with an analyte of interest in FIG. 6.

FIGS. 8 and 9 are a magnified view of the peak of the analyte of interest shown in FIGS. 4 and 6 respectively. As such by comparing the sample spectra and blank spectra of FIG. 8, with the mapped blank spectra and sample spectra of FIG. 9, it can be seen that the mapping process according to embodiments of this disclosure improves the ability of the mapped blank spectrum to align with the structured background radiation present in the sample spectrum. Accordingly, the structured background radiation may be removed from the sample spectrum without an increase in artificial noise. This in turn allows for improved accuracy in the identification of analytes of interest present in the sample spectrum.

As mentioned above, embodiments of this disclosure involve the acquisition of a sample spectrum and a blank spectrum, wherein the blank spectrum comprises structured background radiation which is correlated with the sample spectrum. In the embodiment of method 100, the experimental conditions used to obtain the blank spectrum and the sample spectrum were substantially the same. As such, the background signal resulting from the ICP plasma source was substantially the same in each of the blank and sample spectra.

Thus, the method 100 can utilise a cross-correlation calculation to correct for any thermal drift between the measurement of the sample spectrum and the blank spectrum.

The cross-correlation based methodology of the embodiments of this disclosure provides a robust process for removing background signals from sample spectra. As such, while it is desirable to maintain experimental conditions between measurement of the sample and blank spectra, methods of this disclosure are tolerant to variations in experimental conditions.

Figure 10:
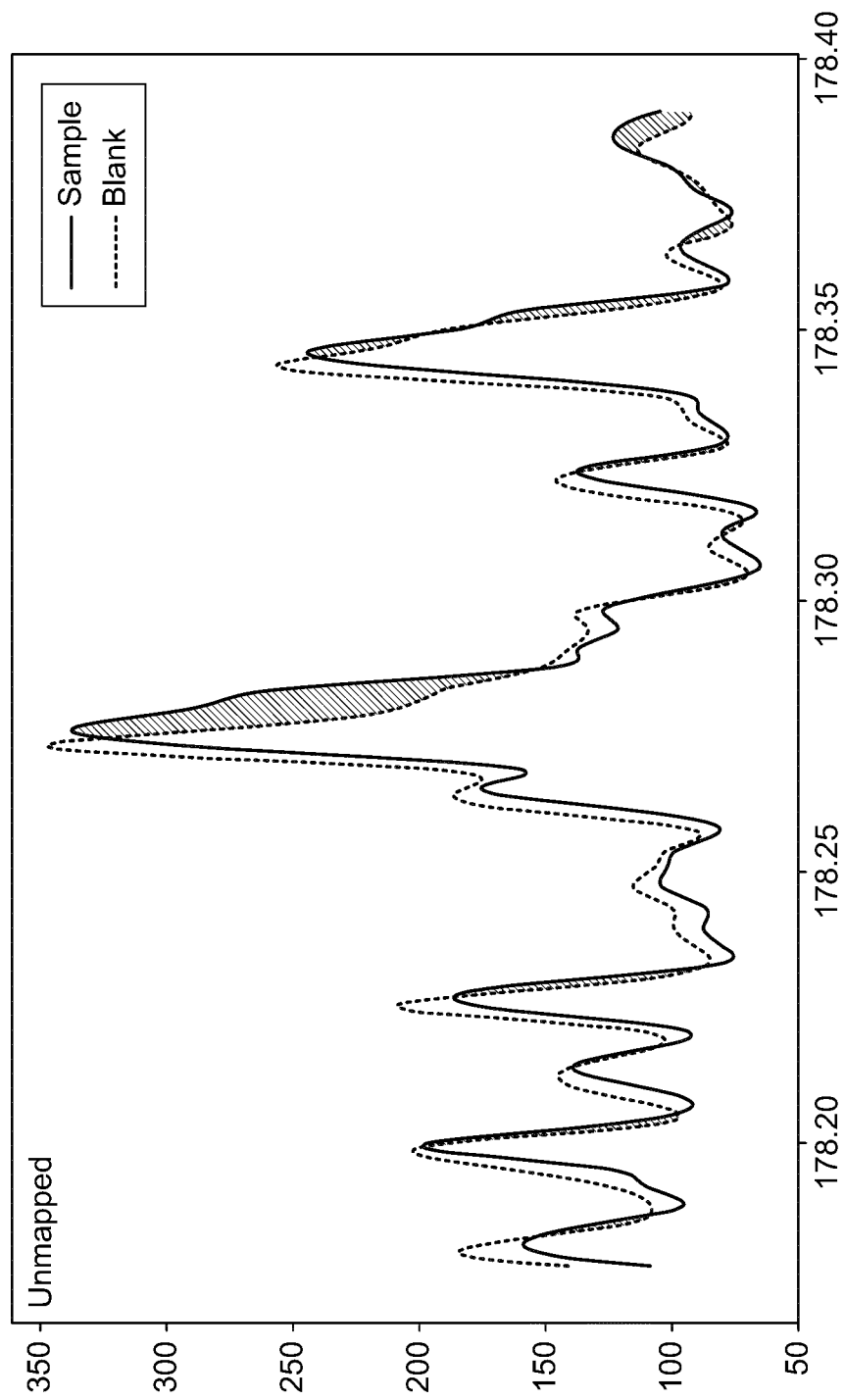
FIG. 10 shows a graph of a further blank spectrum and a further sample spectrum obtained under different experimental conditions.

FIG. 10 shows a sample spectrum and a blank spectrum generated using a spectrometer as shown in FIG. 1. For this example, the gas flow to the plasma source was varied by about 10% between the acquisition of the sample spectrum and the blank spectrum.

Figure 11:
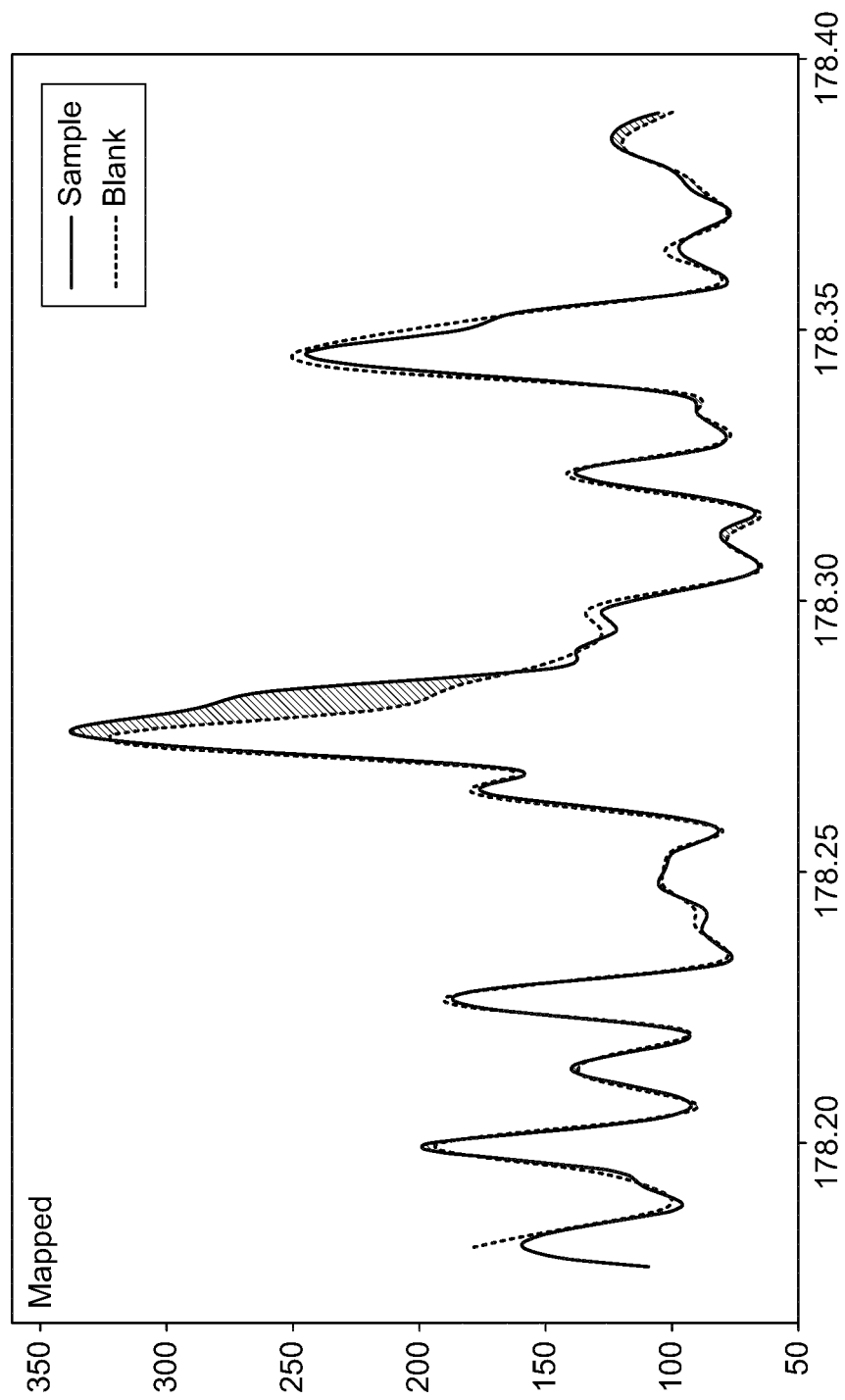
FIG. 11 shows a graph of the further sample spectrum of FIG. 10 and a further mapped blank spectra generated in accordance with an embodiment of the disclosure.

Accordingly, the intensity of the background signal varies between the two spectra, in addition to differences due to noise and thermal drift. The blank spectra may then be mapped to the sample spectrum to generate a mapped blank spectrum in accordance with the method 100 as set out above. FIG. 11 shows a graph of the mapped blank spectrum and the sample spectrum. In this example, intensity scaling can be used to account for the difference in the magnitude of the background signal between the two spectra.

Accordingly, as shown in FIG. 11, the mapped blank spectrum can still closely overlap the sample spectrum.

Figure 12:
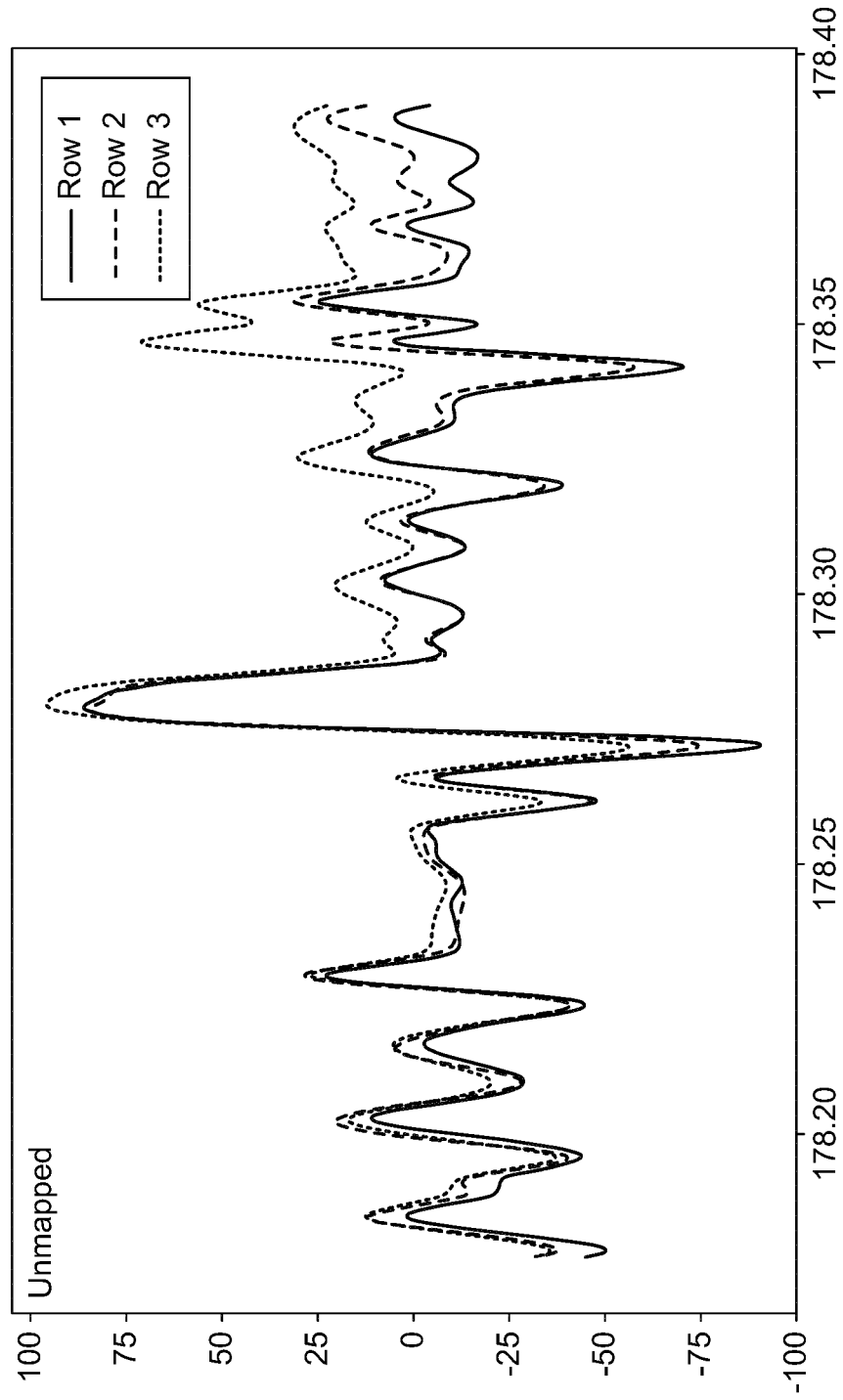
FIG. 12 shows a graph of spectra including artificial noise generated by subtracting further blank spectra from associated sample spectra, where the blank spectra were generated under different experimental conditions to the sample spectra.
Figure 13:
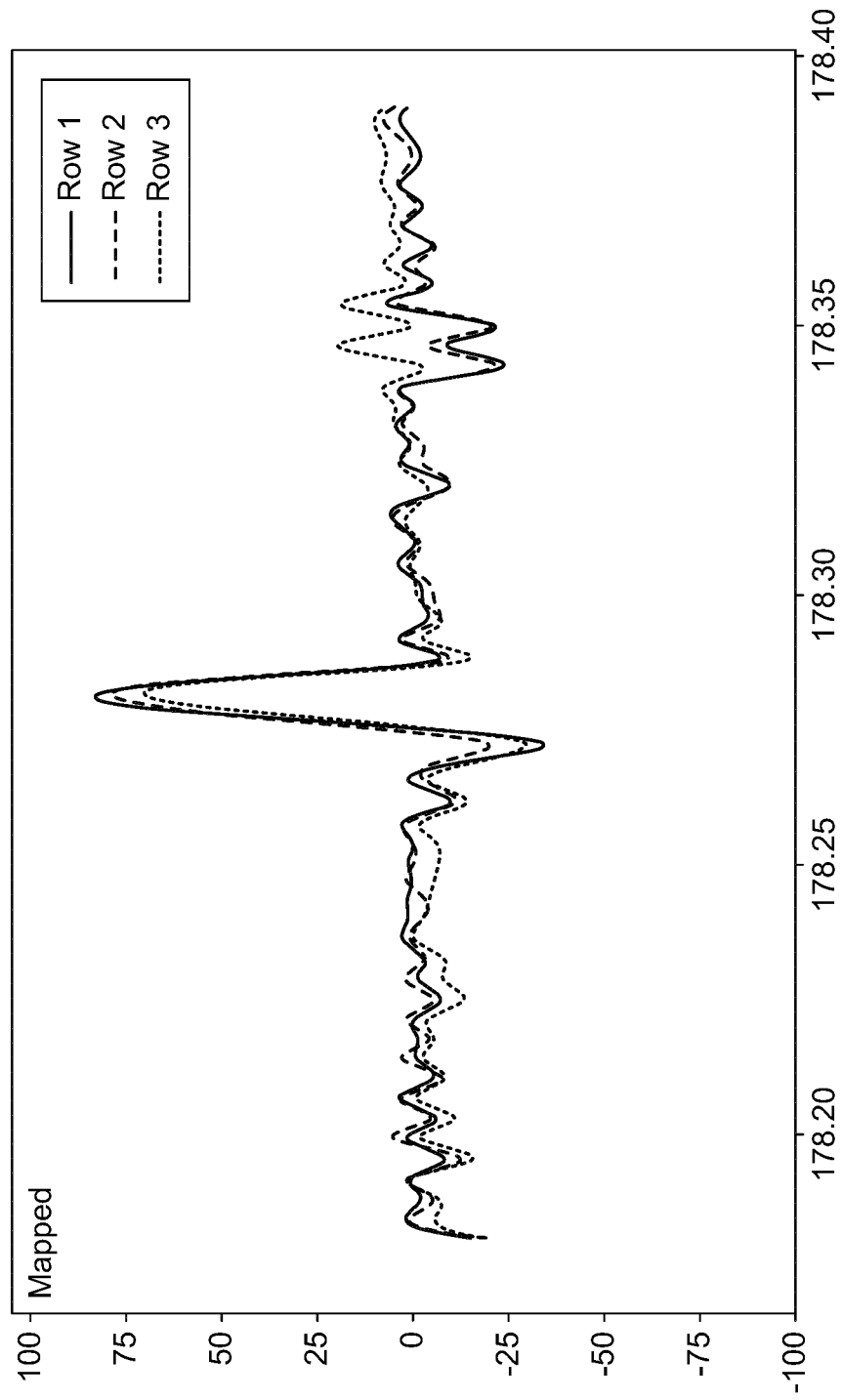
FIG. 13 shows a graph of background corrected spectra generated in accordance with an embodiment of the disclosure where the blank spectra were obtained under different experimental conditions to the sample spectra (10% plasma gas flow difference)

FIG. 12 shows an example of spectra generated by subtracting the blank spectrum from the sample spectrum (i.e. without mapping). Results from three rows of a detector aligned with an order are shown. It will be appreciated that the difference in experimental conditions, in combination with thermal noise has led to a significant increase in artificial noise due to the subtraction process. By contrast, FIG. 13 shows the background corrected sample spectrum generated for the same three rows according to embodiments of this disclosure. As can be seen, even with some variation in experimental conditions, methods according to this disclosure can eliminate background signals from a sample spectrum without a significant increase in artificial noise.

Figure 14:
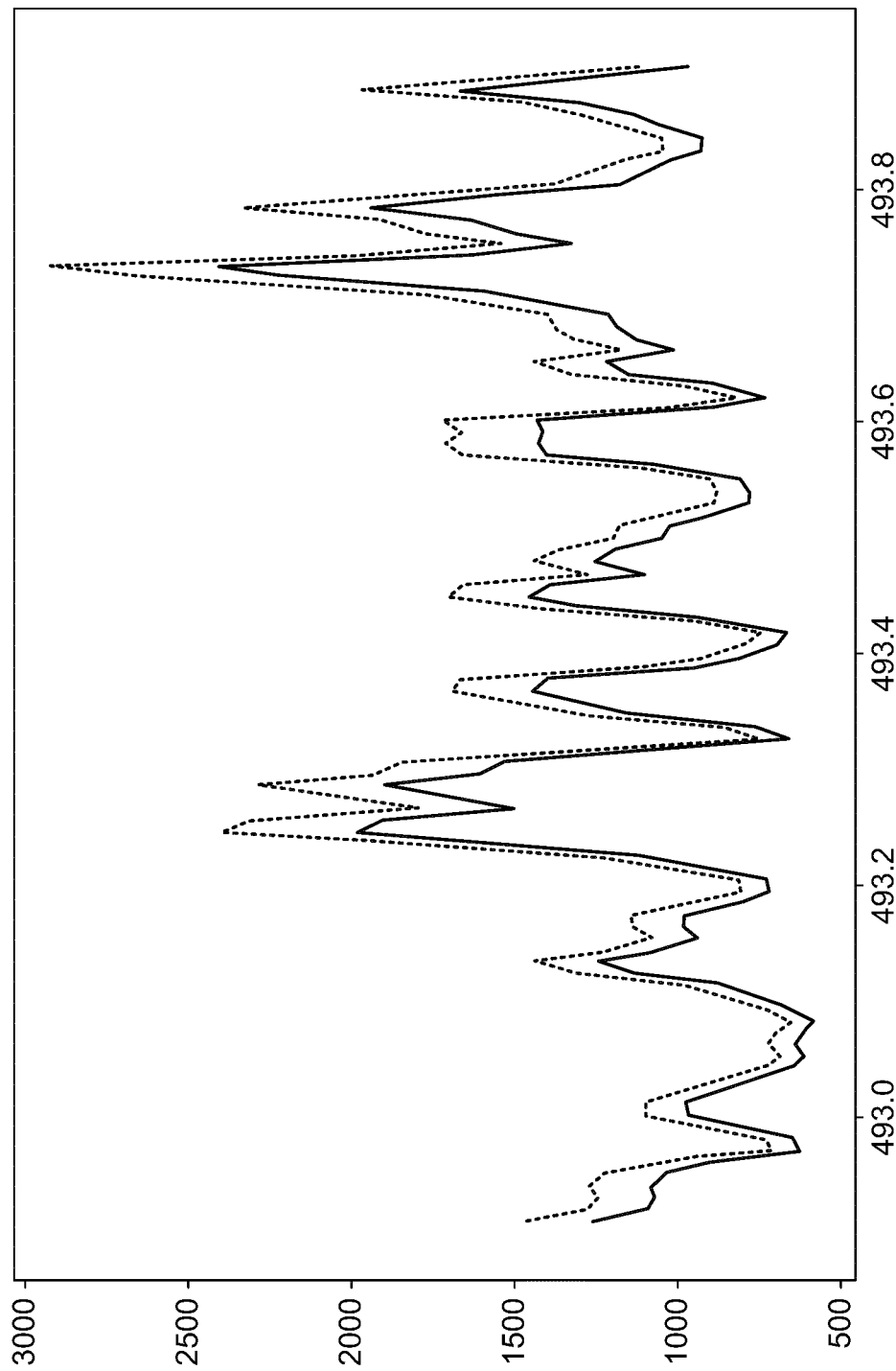
FIG. 14 shows a graph of a portion of a sample spectrum and a blank spectrum where no analyte of interest is present.
Figure 15:
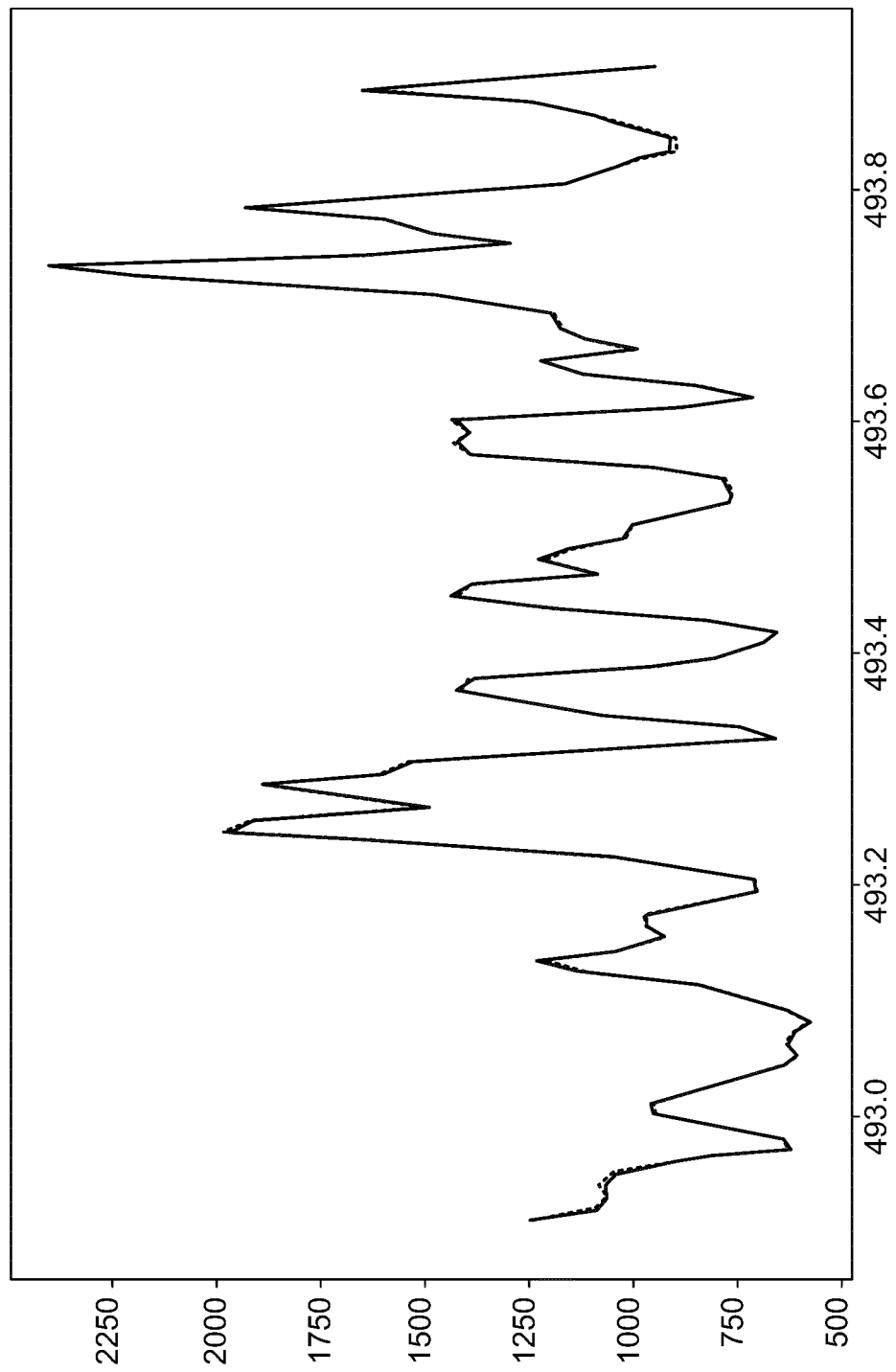
FIG. 15 shows a graph the portion of the sample spectrum of FIG. 14 and a mapped blank spectrum generated according to an embodiment of the disclosure.

Optical spectrometers and methods according to embodiments of this disclosure are provided to remove a background signal from a sample spectrum without causing a statistically significant increase in artificial noise. FIG. 14 shows a graph of a portion of a sample spectrum and a blank spectrum where no analyte of interest is present. The spectra of FIG. 14 may be generated using the optical spectrometer 10 of FIG. 1. Due to thermal drift, the deviation between the blank spectrum and the sample spectrum of FIG. 14 is 98.67. The deviation is calculated by summing of all the absolute values of the difference in intensities between sample and blank at any data point, divided by the number of data points. As such, the deviation in FIG. 14 is the average difference between the intensities of sample and blank spectra. FIG. 15 shows a graph the portion of the sample spectrum of FIG. 14 and a mapped blank spectrum generated according to an embodiment of the disclosure. The mapped blank spectrum is generated from the blank spectrum of FIG. 14. The deviation between the mapped blank spectrum and the sample spectrum is 6.14. As such, the mapping process of embodiments of the disclosure generates a mapped blank spectrum in which the original deviation (between the sample spectrum and the blank spectrum) is significantly reduced (e.g. to less than 10% of the original value). For example, the deviation in the example of FIGS. 14 and 15 is reduced to 6.2% of the original value.

The methods of this disclosure are particularly applicable to an optical spectrometer 10 (see FIG. 1) comprising a plasma source as a light source 11, wherein the plasma source is operated at a relatively low temperature. Such "cold-plasma" analyses may be performed wherein the plasma source is operated at a temperature of no greater than 7000 K. In particular, the present disclosure is applicable to cold-plasma analyses where the plasma source is operated at a temperature of no greater than: 6000 K, 5000, 4900 K, 4000 K, 3000K, 2000 K, 1500 K or 1400 K. While it may be desirable to use a cold-plasma for sample analyses, typically such cold-plasma sources are known to have relatively large magnitude, and highly structured, background radiation (relative to higher temperature plasma sources). This in turn can pose challenges in relation to signal to noise ratio for the detection of analytes of interest. Methods according to this disclosure aim to exploit the highly structure background radiation of such cold-plasma sources to improve detection sensitivity. As the background radiation in cold-plasma sources is highly structured, the mapping process can be used to eliminate the background radiation such that the signal to noise ratio of the subtracted signal is improved.

It will be understood by those skilled in the art that many additions and modifications can be made without departing from the scope of the invention as defined in the following claims.

The invention claimed is:

1. A method of optical spectroscopy for analysing a sample using an optical spectrometer comprising:
   obtaining a sample spectrum of the sample using the optical spectrometer;
   obtaining a blank spectrum using the optical spectrometer, the blank spectrum comprising structured background radiation which is correlated with the sample spectrum;
   determining a cross-correlation of the sample spectrum and the blank spectrum, wherein the cross-correlation of the sample spectrum and the blank spectrum is determined based on a region of the sample spectrum and a corresponding region of the blank spectrum where only the structured background radiation is present;
   generating a mapped blank spectrum by mapping the blank spectrum to the sample spectrum based on the cross-correlation;
   subtracting the mapped blank spectrum from the sample spectrum to generate a background corrected sample spectrum; and
   displaying the background corrected sample spectrum.

2. The method according to claim 1, wherein the step of generating the mapped blank spectrum comprises:
   generating an unscaled mapped blank spectrum by mapping the blank spectrum to the sample spectrum based on the cross-correlation; and
   scaling intensity values of the unscaled mapped blank spectrum based on differences in the intensity values between the unscaled mapped blank spectrum and the sample spectrum, to generate the mapped blank spectrum.

3. The method according to claim 1, wherein
   the optical spectrometer comprises a plasma source for obtaining the sample spectrum and the blank spectrum.

4. The method according to claim 3, wherein
   obtaining the blank spectrum comprises obtaining a gas blank spectrum of the plasma source.

5. The method according to claim 1, wherein
   obtaining the sample spectrum comprises introducing a solution comprising a solvent and the sample into the optical spectrometer.

6. The method according to claim 5, wherein obtaining the blank spectrum comprises introducing a blank solution comprising the solvent without the sample into the optical spectrometer.

7. The method according to claim 1, wherein
   determining the cross-correlation of the sample spectrum and the blank spectrum comprises determining a phase correlation of the sample spectrum and the blank spectrum.

8. The method according to claim 1, wherein
   the sample spectrum comprises a two-dimensional array of first spectrum values; and
   the blank spectrum comprises a two-dimensional array of second spectrum values.

9. The method according to claim 1, further comprising, prior to subtracting the mapped blank spectrum from the sample spectrum, interpolating the sample spectrum, and interpolating the blank spectrum.

10. The method according to claim 1, wherein the sample spectrum and the blank spectrum each comprise an expected wavelength of an analyte of interest for the sample.

11. The method according to claim 1, wherein the sample spectrum and the blank spectrum are obtained using an echelle grating and a detector of the optical spectrometer.

12. An optical spectrometer for analysing a sample, the optical spectrometer comprising a detector and a controller, wherein the controller is configured to cause the optical spectrometer to:
obtain a sample spectrum of the sample using the detector;
obtain a blank spectrum using the detector, the blank spectrum comprising structured background radiation which is correlated with the sample spectrum;
determine a cross-correlation of the sample spectrum and the blank spectrum, wherein the cross-correlation of the sample spectrum and the blank spectrum is determined based on a region of the sample spectrum and a corresponding region of the blank spectrum where only the structured background radiation is present;
generate a mapped blank spectrum by mapping the blank spectrum to the sample spectrum based on the cross-correlation; and
subtract the mapped blank spectrum from the sample spectrum to generate a background corrected sample spectrum.

13. The optical spectrometer according to claim 12, wherein the controller is configured to cause the optical spectrometer to generate the mapped blank spectrum comprising:
generating an unscaled mapped blank spectrum by mapping the blank spectrum to the sample spectrum based on the cross-correlation; and
scaling intensity values of the unscaled mapped blank spectrum based on differences in the intensity values between the unscaled mapped blank spectrum and the sample spectrum, to generate the mapped blank spectrum.

14. The optical spectrometer according to claim 12, further comprising a plasma source, the plasma source and the detector configured to obtain the sample spectrum and the blank spectrum.

15. The optical spectrometer according to claim 14, wherein the controller is configured to cause the optical spectrometer to obtain a gas blank spectrum of the plasma source as the blank spectrum.

16. The optical spectrometer according to claim 12, wherein the optical spectrometer is configured to receive a solution comprising a solvent and the sample for obtaining the sample spectrum.

17. The optical spectrometer according to claim 16, wherein the optical spectrometer is configured to receive the solution comprising the solvent without the sample for obtaining the blank spectrum.

18. The optical spectrometer according to claim 12, further comprising an echelle grating, the echelle grating and the detector configured to obtain the sample spectrum and to obtain the blank spectrum.

19. A non-transitory computer-readable medium having stored thereon processor-executable instructions which, when executed, cause an optical spectrometer to carry out a method of optical spectroscopy, comprising:
obtaining a sample spectrum of a sample using the optical spectrometer;
obtaining a blank spectrum using the optical spectrometer, the blank spectrum comprising structured background radiation which is correlated with the sample spectrum;
determining a cross-correlation of the sample spectrum and the blank spectrum, wherein
the cross-correlation of the sample spectrum and the blank spectrum is determined based on a region of the sample spectrum and a corresponding region of the blank spectrum where only the structured background radiation is present;
generating a mapped blank spectrum by mapping the blank spectrum to the sample spectrum based on the cross-correlation;
subtracting the mapped blank spectrum from the sample spectrum to generate a background corrected sample spectrum; and
displaying the background corrected sample spectrum.

* * * * *